(12) United States Patent
Fujisaki (10) Patent No.: US 7,331,693 B2
(45) Date of Patent: Feb. 19, 2008

(54) ZOOM LENS AND IMAGE PICKUP APPARATUS INCLUDING THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 11/466,177

(22) Filed: Aug. 22, 2006

(65) Prior Publication Data
US 2007/0047103 A1    Mar. 1, 2007

(30) Foreign Application Priority Data
Aug. 26, 2005    (JP) .............................. 2005-246015

(51) Int. Cl.
*F21V 5/00*    (2006.01)
(52) U.S. Cl. .................. 362/326; 362/17; 362/18; 362/299; 359/680; 359/689
(58) Field of Classification Search ................... None
See application file for complete search history.

(56) References Cited
U.S. PATENT DOCUMENTS
5,724,193 A    3/1998  Hirakawa 6,433,937 B1    8/2002  Konno

FOREIGN PATENT DOCUMENTS
JP    2000-330024 A    11/2000

*Primary Examiner*—Sandra O'Shea
*Assistant Examiner*—Kristen A Manskar
(74) *Attorney, Agent, or Firm*—Canon USA., Inc., IP Division (57) ABSTRACT

At least one exemplary embodiment is directed to a zoom lens which includes, in order from an object side to an image side, a first lens unit with a negative refractive power, a second lens unit with a positive refractive power, and a third lens unit with a negative refractive power. The second and third lens units move during zooming. The first lens unit includes a negative biconcave lens element. The zoom lens satisfies the following conditions:

$$-1.4 < \phi 1/\phi w < -1.0$$

$$0.9 < \phi 2/\phi w < 1.4$$

$$-1.3 < \phi 3/\phi w < -0.9$$

where $\phi 1$ is a refractive power of the first lens unit, $\phi 2$ is a refractive power of the second lens unit, $\phi 3$ is a refractive power of the third lens unit, and $\phi w$ is a refractive power of the entire system at a wide-angle end.

11 Claims, 7 Drawing Sheets

ZOOM LENS AND IMAGE PICKUP APPARATUS INCLUDING THE SAME

BACKGROUND OF THE INVENTION

1. Field of the Invention

The present invention relates to a zoom lens and in particular, although not exclusively, to a subminiature zoom lens that has an increased angle of view and high performance used in a small image pickup apparatus.

2. Description of the Related Art

In general optical systems, the ideal image height Y is represented by Y=f tanθ where f is the focal length and θ is the angle of view.

In such an f tanθ projection zoom lens, the amount of light at edges of a screen (peripheral brightness) decreases with an increase in the angle of view in accordance with the cosine fourth law. Therefore, for a wide-angle zoom lens whose angle of view exceeds 80°, the peripheral brightness largely decreases.

In digital image pickup equipment, luminance information on a captured image can be electrically modified. However, because luminance information on the edges is lost, a circuit for correcting the luminance at the edges is necessary.

For an image pickup system of, for example, a digital camera, it is, therefore, difficult to simplify the entire apparatus. In a general wide-angle zoom lens, distortion at the wide-angle end is corrected, and aperture efficiency is increased in order to avoid light falloff at the edges. As a result, an effective diameter of a lens element closest to an object is large.

A zoom lens has been discussed whose lens construction is simplified by actively causing negative distortion and whose angle of view reaches a range covered by a fish-eye lens at the wide-angle end. U.S. Pat. No. 5,724,193 discloses one such zoom lens that is constructed of two or three lens units including leading lens units with negative and positive refractive powers, respectively. In this zoom lens, a distortion of −50% or more is caused at the wide-angle end, thus enabling the wide-angle zoom lens to include a first lens unit of simple lens construction in which lens elements are all spherical, to consist of 7 to 12 lens elements in the entire system, and to achieve an angle of view exceeding 120° at the wide-angle end.

The number of lens elements in the zoom lens disclosed in U.S. Pat. No. 5,724,193 is relatively large at 7 to 12. Additionally, because a lens element closest to the object in the first lens unit is a negative meniscus lens, the effective diameter increases with an increase in the angle of view. Therefore, miniaturization is inevitably difficult.

An existing endoscope objective lens intended for close observation is a zoom lens of a fish-eye lens type having an angle of view of more than 80° at the wide-angle end.

Japanese Patent Laid-Open No. 2000-330024 and U.S. Pat. No. 6,433,937 disclose a zoom lens for a magnifying endoscope that includes three lens units having negative, positive, and negative refractive powers. In both patent documents, causing a distortion of approximately −50% at the wide-angle end enables an endoscope objective lens to have an angle of view of 80° or above with five to seven lens elements.

However, in both patent documents, because a first lens unit includes a negative lens element whose first surface is plane at a position closest to an object, the effective diameter increases with an increase in the angle of view. Therefore, miniaturization is inevitably difficult.

Recently, for miniaturization of the entire apparatus, a zoom lens used for a cellular phone or a small digital camera has been required to have a smaller number of lens elements and a shorter overall lens length. Additionally, the zoom lens has been required to have a wide angle of view for shooting, in particular, that exceeds 80° and a smaller falloff in the peripheral brightness.

In general, an increased number of lens elements in each lens unit in a zoom lens increases the length of each lens unit along the optical axis, and an increased amount of travel of each lens unit during zooming increases the overall lens length. As a result, miniaturization of the overall lens system is difficult.

To address the problems, a smaller number of overall lens elements and a smaller amount of travel of each lens unit during zooming would be useful. Additionally, since, in a wide-angle zoom lens, the peripheral brightness decreases with an increase in the angle of view for shooting, a smaller light falloff at edges of a screen is also greatly useful.

SUMMARY OF THE INVENTION

At least one exemplary embodiment is directed to a zoom lens that has a relatively small number of lens elements, a designed zoom ratio, an increased angle of view, and high optical performance and also provides an image pickup apparatus (e.g., digital image pickup equipment, such as a digital still camera, a cellular phone, and a personal digital assistance (PDA)) including the zoom lens.

According to one aspect of the present invention, a zoom lens includes, in order from an object side to an image side, a first lens unit with a negative refractive power, a second lens unit with a positive refractive power, and a third lens unit with a negative refractive power. The second and third lens units move during zooming. The first lens unit includes a negative biconcave lens element. The zoom lens satisfies the following conditions:

$$-1.4 < \phi1/\phi w < -1.0$$

$$0.9 < \phi2/\phi w < 1.4$$

$$-1.3 < \phi3/\phi w < -0.9$$

where φ1 is a refractive power of the first lens unit, φ2 is a refractive power of the second lens unit, φ3 is a refractive power of the third lens unit, and φw is a refractive power of the entire system at a wide-angle end.

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Exemplary embodiments of a zoom lens and an image pickup apparatus are described below.

Figure 1A:
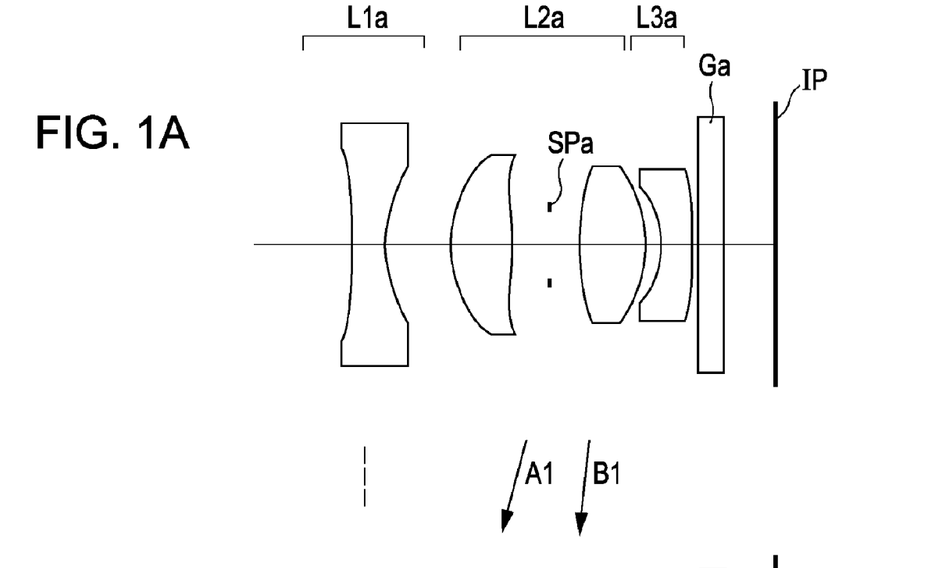
FIGS. 1A to 1C illustrate cross-sectional views of a zoom lens according to a first exemplary embodiment of the present invention.
Figure 1B:
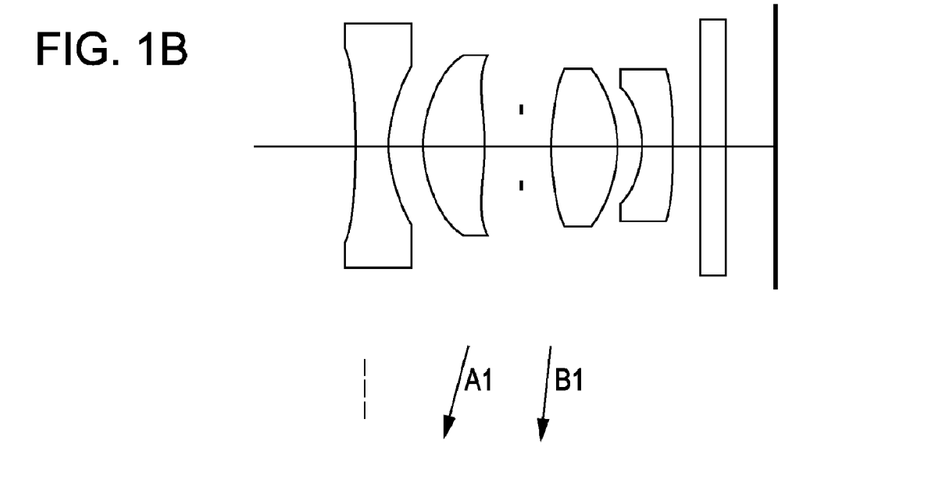
Figure 1C:
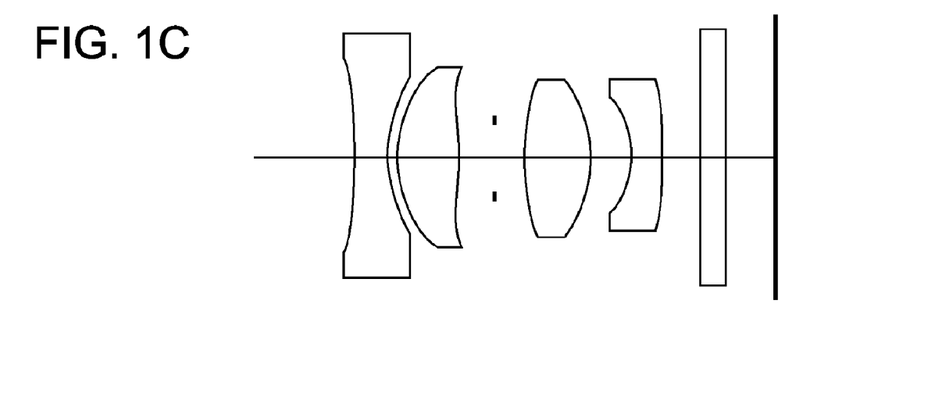

FIGS. 1A, 1B, and 1C illustrate cross-sectional views of a zoom lens according to a first exemplary embodiment at a wide-angle end, at an intermediate zoom position, and at a telephoto end, respectively.

Figure 2A:
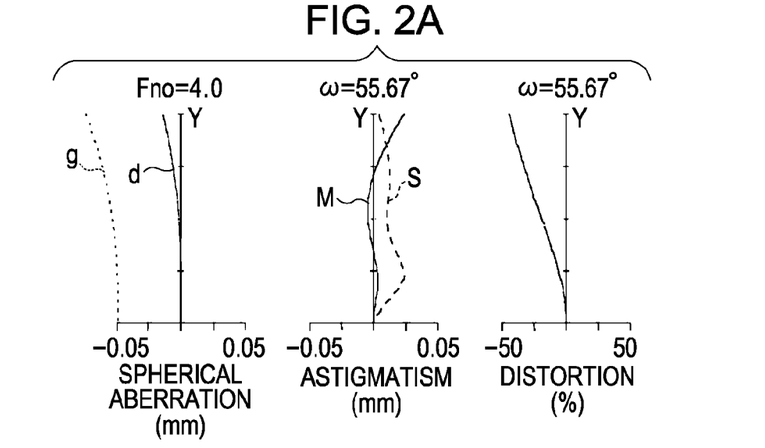
FIGS. 2A to 2C illustrate aberrations in the zoom lens according to a first numerical example of the first exemplary embodiment.
Figure 2B:
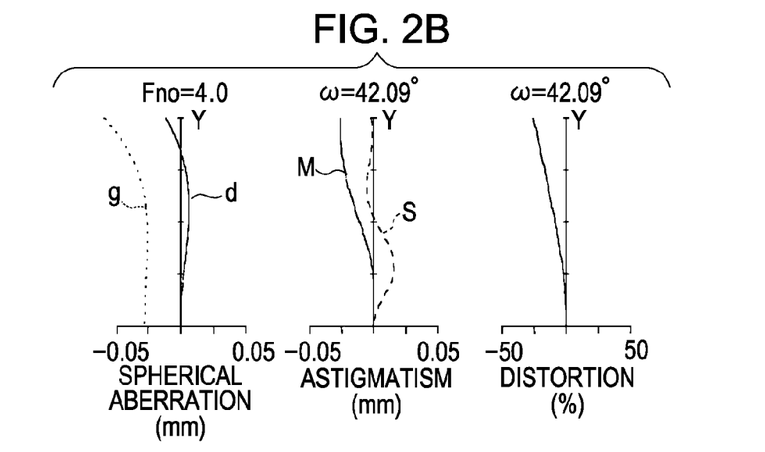
Figure 2C:
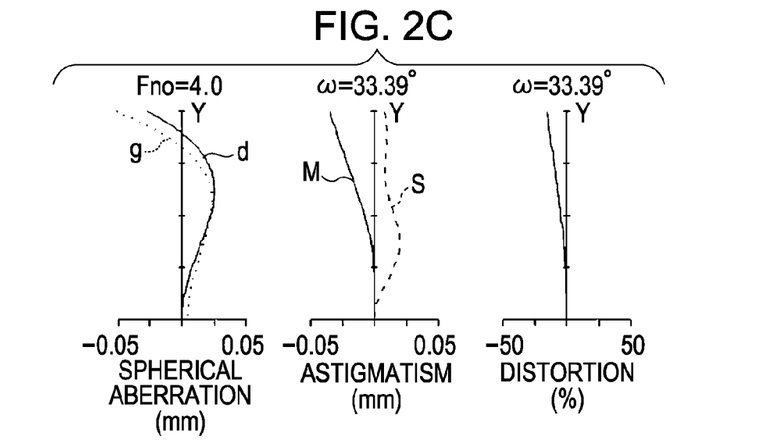

FIGS. 2A, 2B, and 2C illustrate aberrations in the zoom lens according to a first numerical example of the first exemplary embodiment at the wide-angle end, at the intermediate zoom position, and at the telephoto end, respectively. The zoom lens according to the first numerical example has a zoom ratio of 1.61, an aperture ratio of 4.0, and an angle of view at the wide-angle end of 111.3°.

Figure 3A:
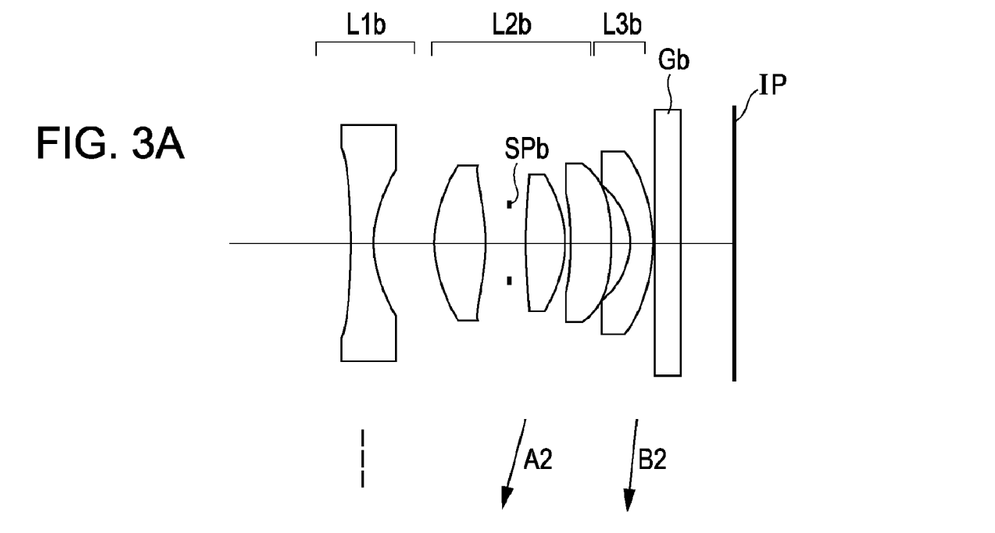
FIGS. 3A to 3C illustrate cross-sectional views of a zoom lens according to a second exemplary embodiment of the present invention.
Figure 3B:
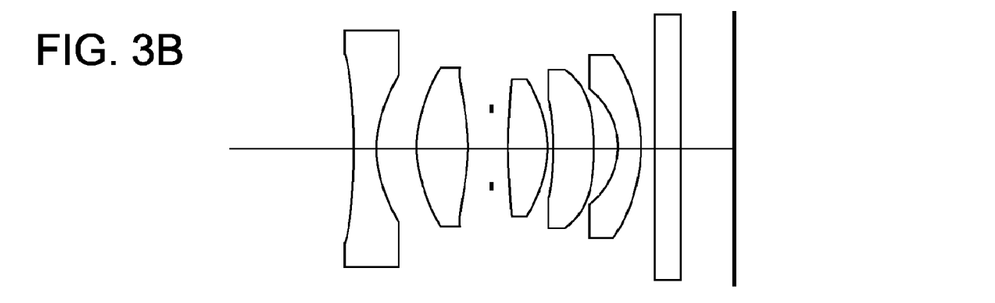
Figure 3C:
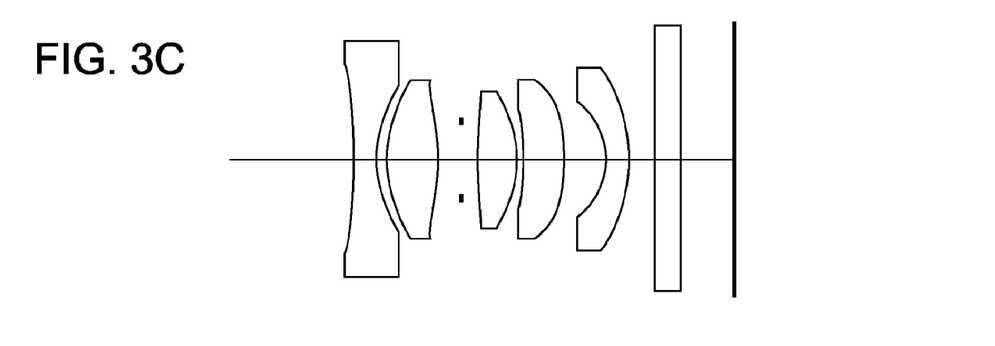

FIGS. 3A, 3B, and 3C illustrate cross-sectional views of a zoom lens according to a second exemplary embodiment at a wide-angle end, at an intermediate zoom position, and at a telephoto end, respectively.

Figure 4A:
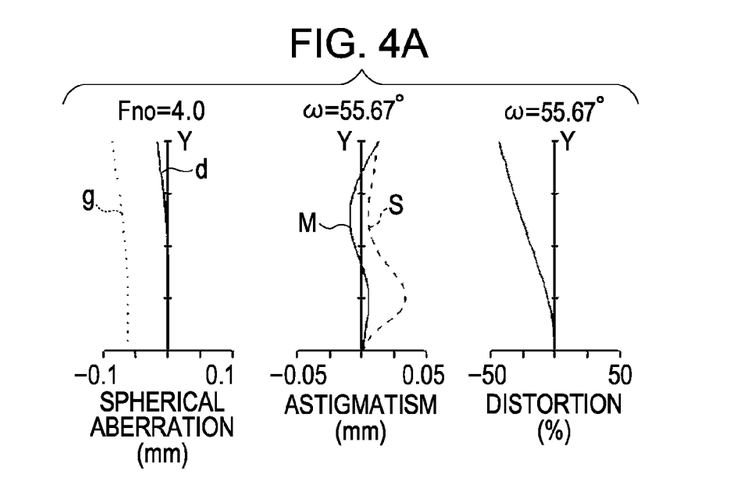
FIGS. 4A to 4C illustrate aberrations in the zoom lens according to a second numerical example of the second exemplary embodiment.
Figure 4B:
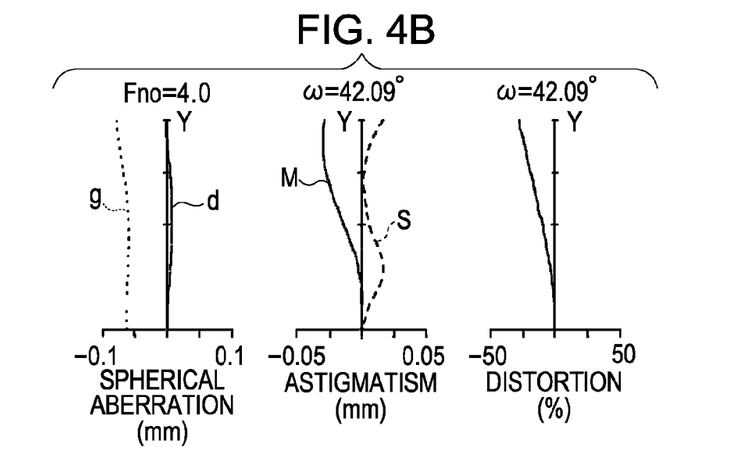
Figure 4C:
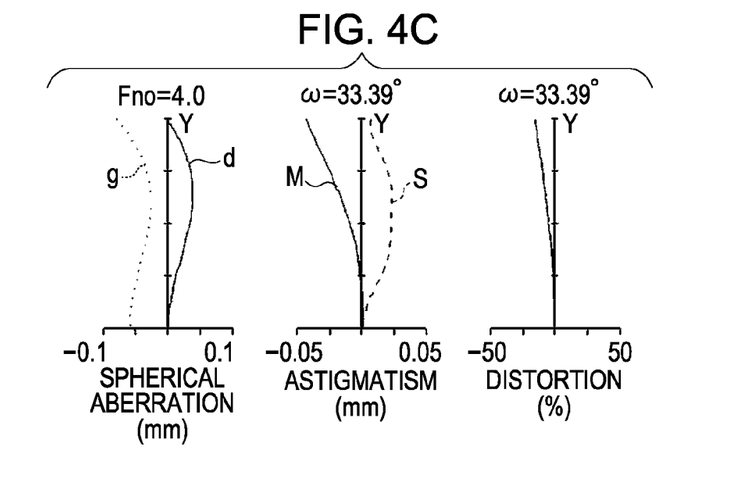

FIGS. 4A, 4B, and 4C illustrate aberrations in the zoom lens according to a second numerical example of the second exemplary embodiment at the wide-angle end, at the intermediate zoom position, and at the telephoto end, respectively. The zoom lens according to the second numerical example has a zoom ratio of 1.61, an aperture ratio of 4.0, and an angle of view at the wide-angle end of 111.3°.

Figure 5A:
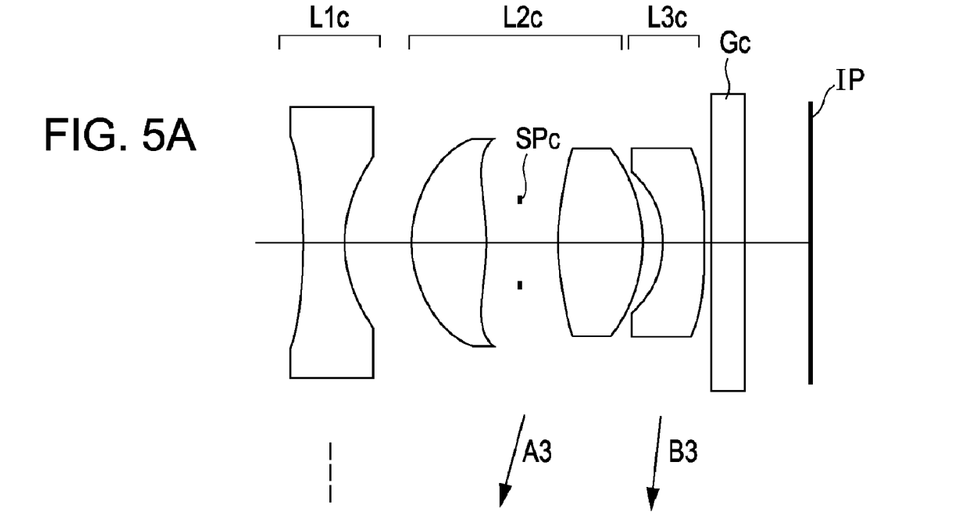
FIGS. 5A to 5C illustrate cross-sectional views of a zoom lens according to a third exemplary embodiment of the present invention.
Figure 5B:
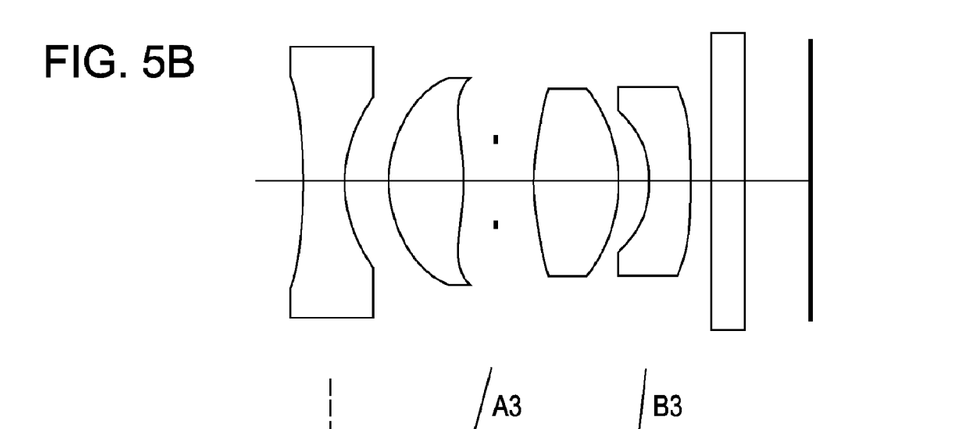
Figure 5C:
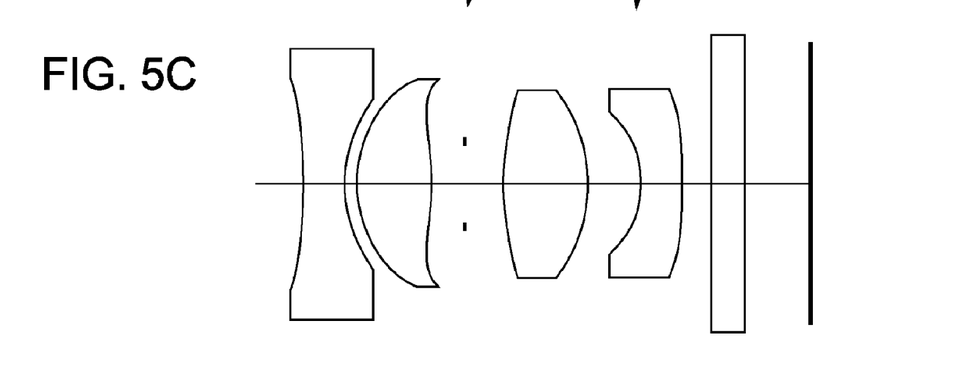

FIGS. 5A, 5B, and 5C illustrate cross-sectional views of a zoom lens according to a third exemplary embodiment at a wide-angle end, at an intermediate zoom position, and at a telephoto end, respectively.

Figure 6A:
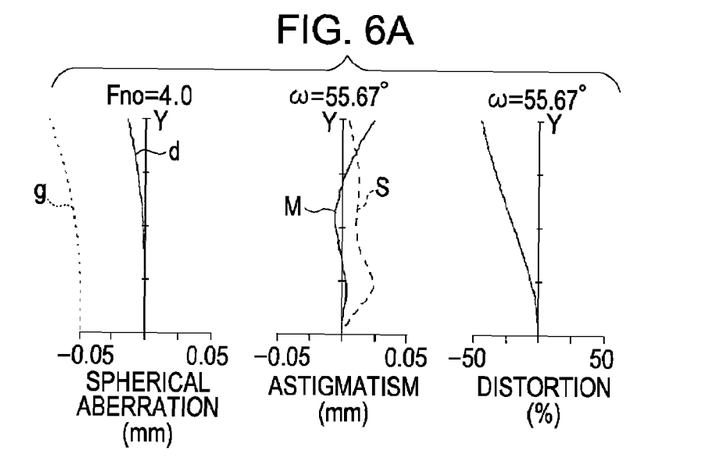
FIGS. 6A to 6C illustrate aberrations in the zoom lens according to a third numerical example of the third exemplary embodiment.
Figure 6B:
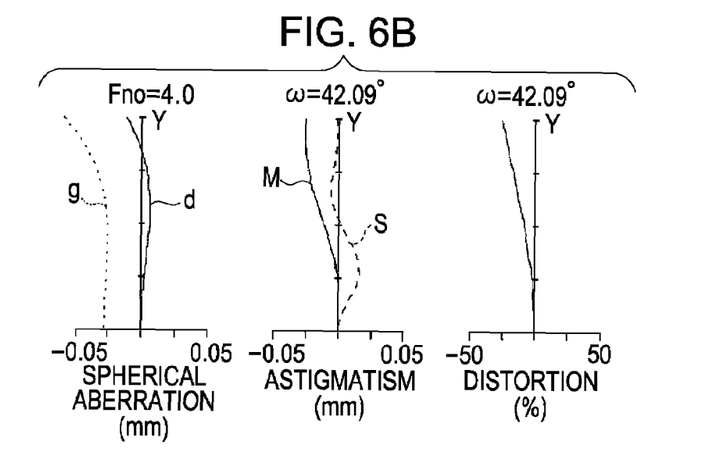
Figure 6C:
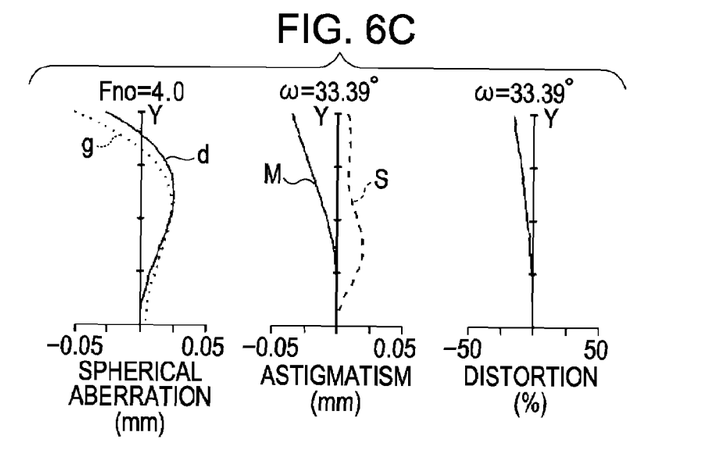

FIGS. 6A, 6B, and 6C illustrate aberrations in the zoom lens according to a third numerical example of the third exemplary embodiment at the wide-angle end, at the intermediate zoom position, and at the telephoto end, respectively. The zoom lens according to the third numerical example has a zoom ratio of 1.48, an aperture ratio of 4.0, and an angle of view at the wide-angle end of 98.7°.

Figure 7:
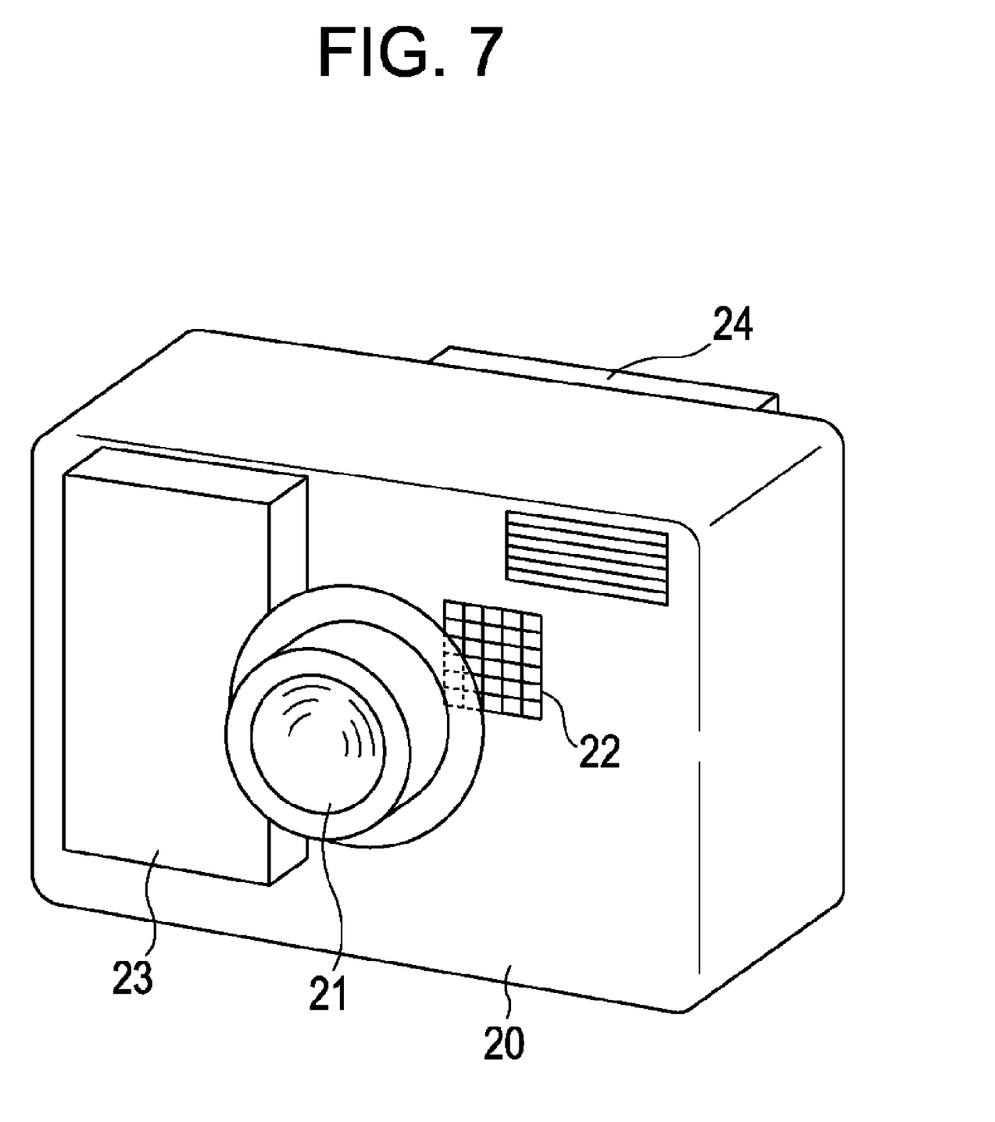
FIG. 7 illustrates a schematic view of an image pickup apparatus according to an exemplary embodiment of the present invention.

FIG. 7 illustrates a schematic view of an image pickup apparatus including a zoom lens according to at least one exemplary embodiment.

The zoom lens according to each exemplary embodiment can be an image-capturing lens system used in an image pickup apparatus (optical equipment). In the cross-sectional views of the zoom lens, the left side represents an object side and the right side represents an image side.

As illustrated in the cross-sectional views, the zoom lens includes a first lens unit L1 (e.g., L1a-L1c) with a negative refractive power (optical power: the reciprocal of its focal length), a second lens unit L2 (e.g., L2a-L2c) with a positive refractive power, and a third lens unit L3 (e.g., L3a-L3c) with a negative refractive power.

An aperture stop SP (e.g., SPa-SPc) can be disposed in the second lens unit L2.

An optical block G (e.g., Ga-Gc) can be an optical filter, a faceplate, a crystal low-pass filter, an infrared cut filter, or other equivalent optical elements as known by one of ordinary skill in the relevant arts. When the zoom lens is used as an image-capturing optical system in an image pickup apparatus (e.g., a camcorder or a digital still camera), a photosensitive surface corresponding to an image pickup surface of a solid-state image pickup device (photoelectric conversion device) can be disposed as an image plane IP. Examples of the solid-state image pickup device include a charge-coupled device (CCD) sensor, a complementary metal-oxide semiconductor (CMOS) sensor, and other photoelectric conversion devices as known by one of ordinary skill in the relevant arts.

In the figures showing the aberrations, "d" denotes the d-line, "g" denotes the g-line, "M" denotes a meridional image surface, "S" denotes a sagittal image surface, "ω" denotes half of the angle of view, and "Fno" denotes the F-number, where the Y-axis in the spherical aberration's graph is entrance pupil radius and the Y-axis in the astigmatism's and distortion's graphs is image height.

In the exemplary embodiments described below, the wide-angle end and the telephoto end indicate the zoom positions when a lens unit functioning to zoom (e.g., the second lens unit L2) lies at the both ends of a range in which the lens unit is mechanically movable along the optical axis.

While the zoom lens zooms from the wide-angle end to the telephoto end, the second lens unit L2 moves (e.g., A1-A3) toward the object side to perform main zooming. The third lens unit L3 nonlinearly moves (e.g., B1-B3) toward the object side so as to compensate for displacements of an image plane occurring in zooming.

In at least one exemplary embodiment the first lens unit L1 does not move for zooming. Focusing is carried out by the movement of the entire system.

In each exemplary embodiment, in order to support an image-capturing optical system used for digital image pickup equipment, the overall lens length and weight is reduced. In particular, the number of lens elements can be reduced. Additionally, the lens effective diameter can be reduced. In each exemplary embodiment, a retrofocus-type lens can be used.

Generally, for a retrofocus-type wide-angle lens, satisfactory correction of distortion and reduction in light falloff at edges can be important. The light falloff at edges can be reduced by increasing the aperture efficiency. Therefore, in most conventional wide-angle lenses, a negative meniscus lens element with a large refractive power is disposed closest to an object.

In contrast, the zoom lens according to each exemplary embodiment forms a so-called fish-eye lens. With the fish-eye lens, the light falloff at edges is reduced, compared with a conventional f tanθ projection lens.

Therefore, in each exemplary embodiment, instead of the negative meniscus lens element, a negative biconcave lens element is disposed closest to an object in the first lens unit L1, which has a negative refractive power.

This reduces the lens effective diameter and the weight of the entire lens system. Since the use of the negative biconcave lens element can increase a refractive power more strongly than that of the negative meniscus lens element, the overall lens length is easily reduced.

Furthermore, actively causing negative distortion and further narrowing the diameter of a light beam that enters the second and subsequent lens units enables the lens effective diameter of the rear lens units to be reduced.

In each exemplary embodiment, the first lens unit L1 includes a negative biconcave lens element, and a first lens surface is an aspheric shape having a negative refractive power that increases from the center toward the edges of the lens element.

As a result, both the occurrence of distortion and other various aberrations are corrected in a balanced manner.

Generally, satisfactory aberration correction for each lens unit can be realized by the provision of at least one lens element that has a refractive power whose sign is different from that of the lens unit as a whole, within the lens unit.

However, such construction increases the number of lens elements and the overall lens length. The number of lens elements and the overall lens length can be reduced by canceling the aberrations among the lens units.

Therefore, in each exemplary embodiment, the zoom lens includes three unit lens units having negative, positive, and negative refractive powers, respectively, such that each of the lent units does not include a lens element that has a refractive power whose sign is different from that of the lens unit. This construction can correct the aberrations among the lens units in a balanced manner.

More specifically, the first lens unit L1, which has a negative refractive power, can include a single negative lens element whose image-side surface is concave.

This facilitates reduction in the size and weight of the first lens unit L1, which increases the lens diameter with an increase in the angle of view. The first lens unit L1 does not move for zooming.

This suppresses an increase in the overall lens length during zooming, thus allowing a zoom drive mechanism to be simple.

The second lens unit L2, which has a positive refractive power, includes at least two or three positive lens elements as a whole. The two positive lens elements or the three positive lens elements include two positive biconvex lens elements. The aperture stop SP disposed in the second lens unit L2 moves together with the second lens unit L2 during zooming.

As described above, the aperture stop SP is disposed in the second lens unit L2 so that the refractive power in the entire lens system is substantially symmetrical. This can cause off-axis aberrations, such as lateral chromatic aberration, curvature of field, and astigmatism, to occur in a symmetrical manner, thus facilitating performing satisfactory aberration correction.

Additionally, the zoom lens having the aperture stop SP disposed in the second lens unit L2 can have larger aperture efficiency than a lens system that has an aperture stop disposed close to an object. Therefore, light falloff at edges, which can be a disadvantage of a wide-angle lens, is suppressed.

The third lens unit L3, which has a negative refractive power, includes a negative meniscus lens element whose image-side surface is convex.

This corrects coma aberration satisfactorily. Additionally, when a solid-state image pickup device is used, the differences between incident angles to an image pickup surface are reduced, and thus the differences between the incident angles of a beam to the entire screen are reduced. Therefore, a balanced optical performance in the entire screen is achieved.

In each exemplary embodiment, an $f\sin\theta$ projection method is used to suppress a decrease in the peripheral brightness of the screen and thus reduce uneven luminance of a captured image.

In other words, $Y=f\sin\theta$ is satisfied where f represents the focal length at a zoom position, $\theta$ represents the incident angle of an incident beam, and Y is the image height at the time.

Generally, in a super-wide-angle lens (e.g., a fish-eye lens), with an $f\sin\theta$ projection method, light distribution is constant from the center of a screen to the edges in theory. In contrast to this, with other projection methods of a fish-eye lens, the peripheral brightness decreases.

Therefore, the $f\sin\theta$ projection method can be used in each exemplary embodiment.

In each exemplary embodiment, the following conditions are satisfied:

$$-1.4 < \phi1/\phi w < -1.0 \tag{1}$$

$$0.9 < \phi2/\phi w < 1.4 \tag{2}$$

$$-1.3 < \phi3/\phi w < -0.9 \tag{3}$$

where $\phi1$ is the refractive power of the first lens unit L1, $\phi2$ is the refractive power of the second lens unit L2, 100 3 is the refractive power of the third lens unit L3, and $\phi w$ is the refractive power of the entire system at the wide-angle end.

As described above, in each exemplary embodiment, the refractive power of each of the first to third lens units L1 to L3 is set such that the conditional expressions (1) to (3) are satisfied. Therefore, when the $f\sin\theta$ projection method is used and a wide angle of view is achieved, light falloff at edges of a screen is reduced.

If these conditional expressions are not satisfied, it can be difficult to achieve a wide angle of view while at the same time sufficient peripheral brightness over the entire screen.

The numerical ranges of the conditional expressions (1) to (3) can be set as follows:

$$-1.3 < 100\ 1/\phi w < -1.05 \tag{1a}$$

$$1.0 < \phi2/\phi w < 1.32 \tag{2a}$$

$$-1.2 < \phi3/\phi w < -0.91 \tag{3a}$$

Additionally, the following condition can be satisfied:

$$0.8 < \phi3/\phi1 < 1.0 \tag{4}$$

where $\phi1$ is the refractive power of the first lens unit L1 and $\phi3$ is that of the third lens unit L3.

The conditional expression (4) serves to enable the first lens unit L1 and the third lens unit L3 to be arranged so that the refractive powers thereof are substantially symmetrical to each other. For example, an SLR camera requires a long back focus to reserve space for a quick return mirror and other members at the image side. Therefore, a general wide-angle lens uses a power arrangement of a retrofocus type.

However, recent digital image pickup equipment have become able to realize a shorter back focus. As a result, the entire lens system can be compacted by weakening the retrofocus feature and approaching a fully symmetrical power arrangement. In the zoom lens that includes three lens units having negative, positive, and negative refractive powers, respectively, the refractive powers can be substantially symmetrical. This arrangement facilitates, for the first and third lens units L1 and L3 with negative refractive powers and the second lens unit L2 with a positive refractive power, the correction and/or reduction of aberrations, such as chromatic aberration, a curvature of field, and astigmatism, in a balanced manner.

If the value of the conditional expression (4) exceeds the lower limit, i.e., the refractive power of the first lens unit L1 is too large, relative to that of the third lens unit L3, the retrofocus feature is increased.

The increased retrofocus feature results in a long back focus, and therefore, the overall lens length is increased. Moreover, a balance in refractive power between the first and third lens unit L1 and L3 and the second lens unit L2 is not maintained, so that satisfactory correction of aberrations (mainly chromatic aberration) can be difficult.

If the value of the conditional expression (4) exceeds the upper limit, i.e., the refractive power of the third lens unit L3 can be too large, relative to that of the first lens unit L1, the incident angle of an off-axis beam to an image-pickup surface is steeper, and this can lead to uneven color in digital image pickup equipment. In addition, the balance in refractive power between the first and third lens units L1 and L3 and the second lens unit L2 may not be maintained, so that satisfactory aberration correction can be difficult.

In each exemplary embodiment, the numerical range of the conditional expression (4) can be set as follows:

$$0.83 < \phi 3/\phi 1 < 0.96 \quad (4a)$$

Additionally, the following condition can be satisfied:

$$3 < \phi F/\phi R < 9 \quad (5)$$

where $\phi F$ is the refractive power of a lens group disposed at the object side with respect to the aperture stop SP and $\phi R$ is the refractive power of a lens group disposed at the image side with respect to the aperture stop SP.

As described above, the refractive powers are appropriately arranged with respect to the aperture stop SP, thus suppressing light falloff at edges when a wide angle of view is achieved.

Furthermore, the occurrence of off-axis aberrations (e.g., curvature of field and the astigmatism) can be reduced.

In each exemplary embodiment, at a zoom position of the wide-angle end, the following conditions can be satisfied:

DIST<−25% (for θ=49°)

In particular, DIST<−33%

DIST<−15% (for θ=40°)

In particular, DIST<−20% where DIST represents a negative distortion at an angle of view for shooting of θ.

As described above, the refractive power of each lens unit, the aperture stop SP, and the paraxial refractive power arrangement are set. Satisfying the above conditions reduces the light falloff at the edges of a screen, where a wide angle of view for shooting at the wide-angle end, which equals or exceeds 80°, is achieved.

In each exemplary embodiment, at the object side with respect to the first lens unit L1 and/or at the image side with respect to the third lens unit L3, a lens unit that has a small refractive power or a converter lens may be disposed.

Numerical examples of the present invention are shown in Tables 1 to 3. In the numerical examples, "i" represents the order of a surface from the object side, "Ri" represents the radius of curvature of an i-th surface from the object side, "di" represents the distance between the i-th surface and the (i+1)-th surface from the object side, and "ndi" and "vi" represent the refractive index and the Abbe number of a material of the i-th surface for a d-line, respectively.

The last two surfaces belong to a glass block (e.g., a filter or a faceplate).

The aspherical shape is represented by the following expression:

$$X = \frac{(1/r)H^2}{1 + \sqrt{(1-(1+k)(H/r)^2)}} + AH^2 + BH^4 + CH^6 + DH^8 + EH^{10} \quad \text{[Formula 1]}$$

where the x-axis is the optical axis, the H-axis is an axis substantially perpendicular to the optical axis, the direction of travel of light is positive, "R" denotes the paraxial radius of curvature, "k" denotes the eccentricity, and "A", "B", "C", "D", and "E" denote aspheric coefficients.

In the numerical examples, "e-Z" refers to "$10^{-z}$", "f" denotes the focal length, "Fno" denotes the F-number, and "ω" denotes half of the angle of view.

The relationship between the above conditional expressions and the numerical values in the numerical examples is shown in Table 4.

The values of distortion at an angle of view for shooting of θ in the numerical examples are shown in Table 5.

The distortion DIST is represented by the following expression:

DIST=(y−y')/y'×100 y'=f tanθ where y' is the ideal image height and y is the actual image height at an angle of view for shooting of θ.

TABLE 1

NUMERICAL EXAMPLE 1 f = 2.53~3.26~4.08
Fno = 4.0~4.0~4.0
2 ω = 111.3°~84.1°~66.8°

| | R | d | nd | v |
|---|---|---|---|---|
| 1 | −9.78157 | 0.6 | 1.73077 | 40.5075 |
| 2 | 1.98074 | variable | 1 | 0 |
| 3 | 2.13337 | 1.15957 | 1.6583 | 53.4398 |

TABLE 1-continued

NUMERICAL EXAMPLE 1

| | | | | |
|---|---|---|---|---|
| 4 | −4.77915 | 0.699641 | 1 | 0 |
| 5 | 0 | 0.550284 | 1 | 0 |
| 6 | 3.89885 | 1.24635 | 1.58913 | 61.2659 |
| 7 | −2.09273 | variable | 1 | 0 |
| 8 | −1.8 | 0.6 | 1.80518 | 25.4595 |
| 9 | −44.5053 | 0.1 | 1 | 0 |
| 10 | 0 | 0.5 | 1.51633 | 64.1411 |
| 11 | 0 | 1 | 1 | 0 |

DISTANCE

| | | | |
|---|---|---|---|
| f | 2.5299 | 3.26439 | 4.08084 |
| d2 | 1.24415588 | 0.69971609 | 0.2 |
| d7 | 0.3 | 0.45917651 | 0.76270262 |

ASPHERIC COEFFICIENT

| R | k | A | B | C | D | E |
|---|---|---|---|---|---|---|
| 1 | 12.4326 | −0.0093412 | 0.00149524 | 0.000094 | −2.2E−05 | 0.000003 |
| 2 | −0.52684 | −0.004151 | −0.009547 | 0.00297401 | 0.0001 | −0.00001 |
| 3 | −0.864518 | 0.00346195 | −0.0041984 | 0.00164437 | 0.001589 | 1.85E−14 |
| 4 | −16.3955 | −0.0007191 | −0.0002193 | 0.00752071 | −0.00017 | 8.28E−15 |
| 7 | 0.335605 | 0.00722941 | 0.00188683 | 0.0118424 | −0.00526 | 6.68E−15 |
| 8 | 0.457732 | −0.0921065 | 0.0379276 | 0.0336752 | −0.01453 | 5.42E−15 |
| 9 | 712.959 | −0.0768612 | 0.0378402 | −0.008061 | 0.00079 | −4.4E−14 |

Field Illumination Ratio:
76.1% (wide-angle end)

TABLE 2

NUMERICAL EXAMPLE 2 f = 2.53~3.26~4.08
Fno = 4.0~4.0~4.0
2 ω = 111.3°~84.1°~66.8°

| | R | d | nd | ν |
|---|---|---|---|---|
| 1 | −19.1227 | 0.4 | 1.62299 | 58.0589 |
| 2 | 1.62373 | variable | 1 | 0 |
| 3 | 1.976 | 0.919162 | 1.58913 | 61.2659 |
| 4 | −3.54653 | 0.443973 | 1 | 0 |
| 5 | 0 | 0.3 | 1 | 0 |
| 6 | 13.0016 | 0.708743 | 1.48749 | 70.4048 |
| 7 | −1.97453 | variable | 1 | 0 |
| 8 | −6.32146 | 0.736349 | 1.58913 | 61.2659 |
| 9 | −3.44453 | variable | 1 | 0 |
| 10 | −1.4232 | 0.4 | 1.68893 | 31.0749 |
| 11 | −6.22776 | 0.02 | 1 | 0 |
| 12 | 0 | 0.5 | 1.51633 | 64.1411 |
| 13 | 0 | 0.998181 | 1 | 0 |

DISTANCE

| | | | |
|---|---|---|---|
| f | 2.5299 | 3.26439 | 4.08084 |
| d2 | 1.12177348 | 0.66342677 | 0.2 |
| d9 | 0.35 | 0.46243261 | 0.75358285 |

ASPHERIC COEFFICIENT

| R | k | A | B | C | D | E |
|---|---|---|---|---|---|---|
| 1 | 49.1445 | −0.0303274 | 0.0133182 | −0.0050554 | 0.001214 | −0.00012 |
| 2 | −0.353075 | −0.0253359 | −0.0100556 | −0.0034396 | 0.0017 | 0.000012 |
| 3 | −0.306226 | −0.0176196 | −0.0192588 | −0.0070284 | 0.009058 | 1.54E−12 |
| 4 | −23.3836 | −0.0477339 | 0.0185305 | 0.0050719 | −0.00087 | 1.87E−12 |
| 8 | −17.0707 | −0.024184 | −0.0022959 | 0.0140918 | −0.0157 | 7.83E−13 |
| 9 | 4.72682 | −0.0251318 | −0.0246833 | 0.0413906 | −0.01803 | 2.08E−10 |
| 10 | −0.140216 | −0.227635 | 0.00941762 | 0.119461 | −0.04495 | 3.15E−12 |
| 11 | 14.9996 | −0.153835 | 0.0808375 | −0.012452 | −0.00141 | 0.000819 |

Field Illumination Ratio:
75.6% (wide-angle end)

TABLE 3

NUMERICAL EXAMPLE 3 f = 2.76~3.26~4.08
Fno = 4.0~4.0~4.0
2 ω = 98.7°~84.1°~66.8°

| R | d | nd | ν |
|---|---|---|---|
| 1 | −9.35314 | 0.6 | 1.73077 | 40.5075 |
| 2 | 1.96388 | variable | 1 | 0 |
| 3 | 1.85852 | 1.082 | 1.6583 | 53.4398 |
| 4 | −4.79885 | 0.509075 | 1 | 0 |
| 5 | 0 | 0.561013 | 1 | 0 |
| 6 | 4.23527 | 1.25237 | 1.58913 | 61.2659 |
| 7 | −2.30188 | variable | 1 | 0 |
| 8 | −1.8 | 0.6 | 1.80518 | 25.4595 |
| 9 | −45.0248 | 0.1 | 1 | 0 |
| 10 | 0 | 0.5 | 1.51633 | 64.1411 |
| 11 | 0 | 1 | 1 | 0 |

DISTANCE

| f | 2.7643 | 3.2644 | 4.0808 |
|---|---|---|---|
| d2 | 0.995547 | 0.663151 | 0.2 |
| d7 | 0.3 | 0.435238 | 0.773605 |

ASPHERIC COEFFICIENT

| R | k | A | B | C | D | E |
|---|---|---|---|---|---|---|
| 1 | 14.1043 | −0.01051 | 0.001701 | 0.00022 | −2.2E−05 | 0.000001 |
| 2 | −0.61534 | −0.0061 | −0.01037 | 0.003497 | 0.000439 | −0.00001 |
| 3 | −0.845601 | 0.004104 | −0.00444 | 0.001315 | 0.003149 | 1.91E−14 |
| 4 | −21.8512 | 0.000497 | −7.2E−05 | 0.012943 | −0.00168 | 8.25E−15 |
| 7 | 0.659469 | −0.00375 | 0.003882 | 0.007679 | −0.00327 | 6.74E−15 |
| 8 | 0.712944 | −0.11817 | 0.033396 | 0.040359 | −0.01237 | 5.44E−15 |
| 9 | 834.027 | −0.09253 | 0.040346 | −0.00832 | 0.000895 | −5.3E−14 |

Field Illumination Ratio:
75.4% (wide-angle end)

TABLE 4

| Conditional Expression | Numerical Example | | |
|---|---|---|---|
|  | 1 | 2 | 3 |
| (1) φ1/φw | −1.146 | −1.061 | −1.272 |
| (2) φ2/φw | 1.087 | 1.274 | 1.295 |
| (3) φ3/φw | −1.079 | −0.913 | −1.180 |
| (4) φ3/φ1 | 0.941 | 0.860 | 0.927 |
| (5) φF/φR | 3.513 | 4.362 | 8.295 |

As described above, according to each exemplary embodiment, a small light-weight wide-angle zoom lens suited for small digital image pickup equipment can be provided, the zoom lens having a smaller lens effective diameter, a smaller number of lens elements, a shorter overall lens length, an angle of view that can exceed 80°, and a reduced light falloff at edges of a screen.

An exemplary embodiment of a digital still camera (image pickup apparatus) using a zoom lens according to at least one exemplary embodiment as an image-capturing optical system is described below with reference to FIG. 7.

In FIG. 7, a camera body 20 incorporates a solid-state image pickup device (e.g., photoelectric conversion device) 22 for receiving light for an object's image formed by an image-capturing optical system 21 including the zoom lens

TABLE 5

| Numerical Example 1 θ | DISTORTION (PERCENT) | Numerical Example 2 θ | DISTORTION (PERCENT) | Numerical Example 3 θ | DISTORTION (PERCENT) |
|---|---|---|---|---|---|
| 0 | 0 | 0 | 0 | 0 | 0 |
| 8.33 | −1.01259 | 8.33 | −0.99631 | 6.65 | −0.61708 |
| 16.32 | −3.88981 | 16.32 | −3.84843 | 13.12 | −2.43961 |
| 23.72 | −8.22005 | 23.72 | −8.12633 | 19.27 | −5.35587 |
| 30.36 | −13.46975 | 30.36 | −13.20638 | 25 | −9.13214 |
| 36.21 | −19.12793 | 36.21 | −18.59045 | 30.23 | −13.4494 |
| 41.3 | −24.80958 | 41.3 | −24.00296 | 34.97 | −18.00816 |
| 45.71 | −30.2683 | 45.71 | −29.26956 | 39.21 | −22.59118 |
| 49.51 | −35.36666 | 49.51 | −34.26075 | 43 | −27.05901 |
| 52.81 | −40.04353 | 52.81 | −38.89475 | 46.37 | −31.32633 |
| 55.67 | −44.28692 | 55.67 | −43.13643 | 49.37 | −35.34457 | according to at least one exemplary embodiment. Examples of the solid-state image pickup device 22 include a CCD sensor and a CMOS sensor. A memory 23 is used for storing information corresponding to the object's image subjected to photoelectrical conversion. A viewfinder 24 is made from a liquid-crystal display panel or other display device as known by one of ordinary skill in the relevant art for use in observing the object's image formed on the solid-state image pickup device 22.

As described above, a zoom lens in accordance with at least one exemplary embodiment is applied to the image pickup apparatus (e.g., digital still camera), thus facilitating the small image pickup apparatus with high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-246015 filed Aug. 26, 2005, which is hereby incorporated by reference herein in its entirety.

What is claimed is:

1. A zoom lens comprising, in order from an object side to an image side:
    a first lens unit with a negative refractive power;
    a second lens unit with a positive refractive power; and;
    a third lens unit with a negative refractive power,
    wherein the second lens unit and the third lens unit move during zooming,
    wherein the first lens unit includes a negative biconcave lens element, and
    wherein the following conditions are satisfied:

$-1.4 < \phi1/\phi w < -1.0$ $0.9 < \phi2/\phi w < 1.4$ $-1.3 < \phi3/\phi w < -0.9$ where $\phi1$ is a refractive power of the first lens unit, $\phi2$ is a refractive power of the second lens unit, $\phi3$ is a refractive power of the third lens unit, and $\phi w$ is a refractive power of the entire system at a wide-angle end.

2. The zoom lens according to claim 1, wherein the following condition is satisfied:

$0.8 < \phi3/\phi1 < 1.0$.

3. The zoom lens according to claim 1, further comprising an aperture stop disposed in the second lens unit, the aperture stop moving together with the second lens unit during zooming,
    wherein the following condition is satisfied:

$3 < \phi F/\phi R < 9$ where $\phi F$ is a refractive power of a lens group disposed at the object side with respect to the aperture stop and $\phi R$ is a refractive power of a lens group disposed at the image side with respect to the aperture stop.

4. The zoom lens according to claim 1, wherein the negative biconcave lens element has an aspheric object-side surface whose negative refractive power increases from the center thereof to the periphery thereof.

5. The zoom lens according to claim 1, wherein each of the first lens unit, the second lens unit, and the third lens unit includes one or more lenses having refractive powers of the same sign as their respective lens units.

6. The zoom lens according to claim 1, wherein the second lens unit includes at least two positive lens elements, the two positive lens elements including two biconvex lens elements.

7. The zoom lens according to claim 1, wherein the third lens unit includes a single negative meniscus lens element whose image-side surface is convex.

8. The zoom lens according to claim 1, wherein the first lens unit does not move for zooming.

9. The zoom lens according to claim 1, wherein an image is formed on a solid-state image pickup device.

10. The zoom lens according to claim 1, wherein the zoom lens uses a projection method that satisfies the following expression:

$Y = f \sin\theta$ where f is a focal length at a zoom position and Y is an ideal image height at an angle of view for shooting of θ degrees.

11. An image pickup apparatus comprising:
    a zoom lens according to claim 1; and
    a solid-state image pickup device configured to receive light for an image formed by the zoom lens.

* * * * *